July 17, 1962 W. LERCH 3,044,159
DOUBLE PANE WIRE-REINFORCED GLASS AND METHOD
OF PRODUCING THE SAME
Filed July 22, 1958
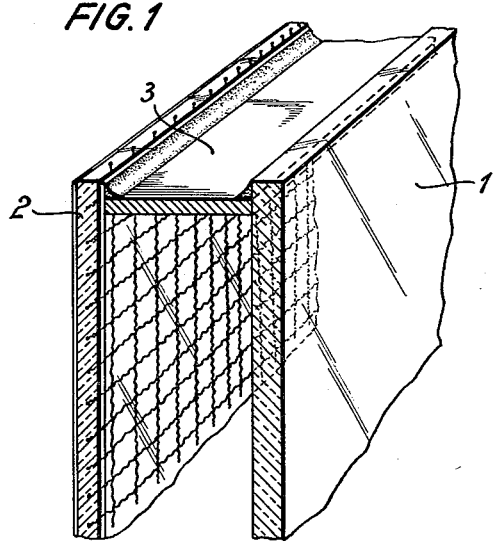
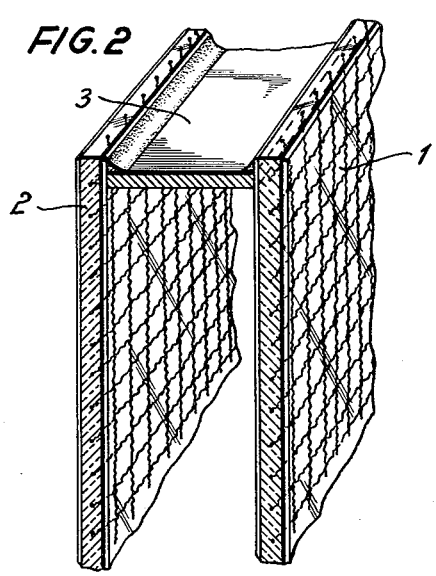
INVENTOR
WALTER LERCH
ATTORNEYS … # 3,044,159
DOUBLE PANE WIRE-REINFORCED GLASS AND METHOD OF PRODUCING THE SAME Walter Lerch, Gelsenkirchen-Schalke, Germany, assignor to Glas- und Spiegel-Manufactur Aktiengesellschaft, Gelsenkirchen-Schalke, Germany
Filed July 22, 1958, Ser. No. 750,207
Claims priority, application Germany Mar. 29, 1958
2 Claims. (Cl. 29—419)

The present invention relates to double-pane glass units made of wire-reinforced glass, and to a method of producing the same.

In all glass structures which form the ceiling of a room or which are installed into the ceiling, for example, in horizontally placed glass panes or glass panes for roofs of manufacturing plants, sawmills, sheds, and the like, it is advisable for reasons of safety to use wire-reinforced glass. In many countries, such glass is even prescribed by law for this purpose in order to prevent any injuries to persons which might be in the rooms below such glass-covered structures in the event of a destruction thereof. Consequently, in most houses or manufacturing plants any horizontal or inclined glass panes consist of wire-reinforced glass or other shatterproof types of glass. Such use of wire-reinforced or similar shatterproof glass which has been conventional for many years has, however, the disadvantage that the rooms covered thereby will be excessively cooled and that such glass panes will be easily covered by water condensing thereon.

Although these disadvantages could be easily avoided by the use of several parallel panes of glass, as it is conventional in vertical windows, an upper glass covering of this type for rooms, for example, by horizontal glass panes, is very impractical, complicated, and expensive if it requires several wire-reinforced glass panes to be mounted in separate frames.

There has been already a considerable production and use of various types of so-called insulating glass, for example, in the form of double-pane units, in which two or more panes of glass are combined into a unit at a certain distance from each other so as to avoid the necessity of a double frame. Such double-pane units can be easily fitted into a single window frame. These known double-pane units consist of two spaced parallel glass panes which are combined with a metallic spacing strip by solder and attain a considerable degree of insulation against heat or cold, as well as sound. The hermetical sealing of the edges of such unit also prevents absolutely any penetration of dust and moisture between the individual panes.

Although it has been possible to make such double-pane units of all conventional types of glass, it has so far been impossible to make them of wire-reinforced glass. Therefore, wherever horizontal or inclined glass panes were required, such double-pane units could not be used.

Although in the manufacture of insulating glass which consists of a combination of glass and metal by means of a soldered-on strip of lead, many efforts have also been made to use wire-reinforced glass, they have so far proved of no avail for the reasons stated below.

The usual double-pane units were produced, for example, by spraying a copper alloy, usually a copper titanium alloy, in a liquid condition upon the edges of the glass panes, by then applying thereon molten soldering tin in the form of droplets, and by finally connecting the edges by means of solder with a metallic spacing strip, preferably of lead. The spraying of the copper alloy was carried out by means of a spray gun. The soldering tin, after being applied in droplets, was ironed out or applied with a soldering iron.

It has now been found that the application of the soldering tin in the form of droplets upon the copper coating on the glass edges results in considerable tensions which lead to cracks and fissures in the glass panes. This sudden heating of the glass by the application of the soldering tin is especially harmful if an inhomogeneous material is being used. Since the glass and the wire insert of wire-reinforced glass have entirely different coefficients of expansion, and since very considerable tensions thus occur in the glass, it has so far been impossible by means of the known methods to produce double-pane glass units which consisted of wire-reinforced glass.

Thus it was found to be extremely unfavorable that, even when the wire-reinforced glass panes were previously cut and subsequently broken off, very fine cracks occurred at the cut edge, and that these fine cracks would then continue to run inwardly due to the heat treatment and would completely destroy the glass panes.

It has now been found according to the present invention that double-pane glass units of wire-reinforced glass may also be produced by modifying the method which has previously been used.

The method according to the present invention of producing double-pane glass units especially of wire-reinforced glass, at first follows the same steps as the prior method. Thus, at first a copper alloy, preferably a copper-titanium alloy, is sprayed upon the edges of the glass panes by means of a spray gun, whereupon the soldering tin is applied and the edges are connected to the metallic spacing strip by means of solder.

However, as distinguished from the prior method, the method according to the present invention further consists in binding and, if necessary, finishing the cut edges of the wire-reinforced glass panes before the copper coating is being applied. It has been found that, by such treatment, all the unevennesses of the edges which were caused by the preliminary treatment, and especially by the cutting of the panes, will be avoided and that thereby the occurrence of the usual fine cracks in the edges may be entirely prevented.

According to the present invention, it has further been found to be of a very great advantage if the edges of the glass panes will be heated from the outside, for example, by flames, before the metals are being applied thereon, as well as during and after such application of the metals. Such heating of the cut edges has even the advantage that any small cracks or fissures which might have occurred in the edge portions will be fused together and will thus be healed.

Evidently, the method according to the present invention is applicable not only to double-pane glass units but also to multiple-pane insulating units. It is also within the scope of the present invention not to make all of the glass panes of the unit of wire-reinforced glass but to apply therein only a single wire-reinforced glass pane.

According to the present invention, it will now be possible to produce insulating glass which can also be used for horizontal or inclined window installations so that even large roofs of manufacturing plants, hangars, and the like may now be covered with wire-reinforced insulating glass. Thus it will now also be possible on such glass windows to prevent the formation of a moisture coating caused by condensation and to reduce considerably the amount of heat required to heat the rooms which are covered by such glass roofs or windows.

The features of the present invention as above described in detail are illustrated diagrammatically in the accompanying drawings, in which:

FIGURES 1 and 2 show perspective views of parts of two double-pane units according to two different embodiments of the present invention.

The double-pane unit as illustrated in FIGURE 1 is composed of a pane of plate glass 1 and a pane of wire-reinforced glass 2. The two panes of glass are combined with each other by means of a metallic spacing strip 3 which is connected to both panes by means of solder.

The embodiment of the invention as illustrated in FIGURE 2 differs from that shown in FIGURE 1 merely by the fact that both panes 1 and 2 consist of wire-reinforced glass. Both drawings also indicate that the edges of the wire-reinforced glass panes have been finished and provided with a binding.

Also my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A method of fabricating double-pane insulating glass units at least one of the panes of which consists of wire-reinforced glass, which includes the steps of providing a pair of glass panes at least one of which is a wire-reinforced glass pane having cut edges, mechanically grinding the edge portions of the cut edges of said wire-reinforced glass pane, smoothing and polishing said ground edge portions whereby said wire-reinforced glass pane acquires a border and becomes crack-resistant, spraying copper alloy in liquid form on to the edges of said crack-resistant pane, applying thereover soldering tin, firmly positioning a metallic spacer strip between two of said panes while maintaining the said panes in juxtaposed parallel position, and sealing the same to form a unitary structure.

2. Method according to claim 1 which comprises externally heating said ground, smoothed and polished glass edge prior to application of the copper alloy and soldering tin thereto, said heating being effected to a temperature sufficient to fuse any small crack which might be formed on application of the copper alloy and soldering tin.

References Cited in the file of this patent
UNITED STATES PATENTS

| | | |
|---|---|---|
| 2,090,861 | Eisele | Aug. 24, 1937 |
| 2,118,643 | Fox | May 24, 1938 |
| 2,196,109 | Eastus | Apr. 2, 1940 |
| 2,235,680 | Haven et al. | Mar. 18, 1941 |